(12) United States Patent
Breton et al.

(10) Patent No.: US 8,584,084 B2
(45) Date of Patent: Nov. 12, 2013

(54) SYSTEM FOR LIBRARY CONTENT CREATION

(75) Inventors: Pierre-Felix Breton, Chambly (CA); John Schrag, Toronto (CA)

(73) Assignee: AUTODESK, Inc., San Rafael, CA (US)

(\*) Notice: Subject to any disclaimer, the term of this patent is extended or adjusted under 35 U.S.C. 154(b) by 1151 days.

(21) Appl. No.: 12/269,828

(22) Filed: Nov. 12, 2008

(65) Prior Publication Data
US 2010/0122243 A1     May 13, 2010

(51) Int. Cl.
*G06F 9/44* (2006.01)

(52) U.S. Cl.
USPC ............................ 717/108; 717/114; 717/116

(58) Field of Classification Search
USPC .................................. 717/104–116, 163–166
See application file for complete search history.

(56) References Cited

U.S. PATENT DOCUMENTS

| | | | |
|---|---|---|---|
| 5,428,792 A * | 6/1995 | Conner et al. ................ | 717/143 |
| 5,481,665 A | 1/1996 | Okada et al. | |
| 5,604,824 A | 2/1997 | Chui et al. | |
| 5,617,564 A * | 4/1997 | Tomotake ............................. | 1/1 |
| 5,687,304 A | 11/1997 | Kiss | |
| 5,696,892 A | 12/1997 | Redmann et al. | |
| 5,710,878 A | 1/1998 | McCoy et al. | |
| 5,758,153 A * | 5/1998 | Atsatt et al. ............................ | 1/1 |
| 5,790,131 A | 8/1998 | Liang et al. | |
| 5,835,093 A | 11/1998 | Fujishita et al. | |
| 5,848,273 A * | 12/1998 | Fontana et al. ............... | 717/108 |
| 5,886,701 A | 3/1999 | Chauvin et al. | |
| 5,991,770 A | 11/1999 | Zamora-McKelvy et al. | |
| 6,081,665 A * | 6/2000 | Nilsen et al. ................... | 717/116 |
| 6,128,540 A | 10/2000 | Van Der Vegt et al. | |
| 6,151,624 A | 11/2000 | Teare et al. | |
| 6,226,788 B1 * | 5/2001 | Schoening et al. ........... | 717/107 |
| 6,253,366 B1 * | 6/2001 | Mutschler, III ............... | 717/104 |
| 6,263,496 B1 * | 7/2001 | Meyer et al. ................... | 717/114 |
| 6,456,288 B1 | 9/2002 | Brockway et al. | |
| 6,487,713 B1 * | 11/2002 | Cohen et al. ................... | 717/105 |
| 6,518,989 B1 | 2/2003 | Ishikawa | |
| 6,574,791 B1 * | 6/2003 | Gauthier et al. .............. | 717/107 |
| 6,601,234 B1 * | 7/2003 | Bowman-Amuah .......... | 717/108 |
| 6,867,781 B1 | 3/2005 | Van Hook et al. | |
| 6,868,538 B1 * | 3/2005 | Nixon et al. ................... | 717/100 |

(Continued)

OTHER PUBLICATIONS

Narasimhan et al, "A class of phorometric invariants: separating material from shap and illumination", IEEE ICCV, pp. 1-8, 2003.*

(Continued)

*Primary Examiner* — Anil Khatri
(74) *Attorney, Agent, or Firm* — Patterson & Sheridan, LLP

(57) ABSTRACT

A method for generating a library of materials that can be applied to geometry in a graphics scene when performing rendering operations. The method includes generating a class file that includes material parameters representing rendering characteristics of a material class and generating a library root file that includes a reference to the class file. The method further includes generating a rendering implementation file for translating values of the material parameters into a format recognized by a particular rendering engine and generating a user interface file that includes at least one user interface configured to allow a user to modify the values of the material parameters. The method also includes linking the class file to the library root file, and linking the rendering implementation file and the user interface file to the class file. Advantageously, the library can be organized and updated more effectively when compared to prior art techniques.

16 Claims, 9 Drawing Sheets

(56) References Cited

U.S. PATENT DOCUMENTS

| | | | |
|---|---|---|---|
| 6,947,037 B1 | 9/2005 | Lynn et al. | |
| 7,017,148 B2* | 3/2006 | Kumar | 717/114 |
| 7,023,437 B1 | 4/2006 | Voorhies et al. | |
| 7,146,601 B2* | 12/2006 | Allison | 717/114 |
| 7,263,686 B2* | 8/2007 | Sadiq | 717/110 |
| 7,266,616 B1 | 9/2007 | Munshi et al. | |
| 7,307,640 B2 | 12/2007 | Demers et al. | |
| 7,318,216 B2* | 1/2008 | Diab | 717/108 |
| 7,412,404 B1* | 8/2008 | Tenorio | 715/236 |
| 7,423,653 B2 | 9/2008 | Gettman et al. | |
| 7,523,411 B2 | 4/2009 | Carlin | |
| 7,565,640 B2* | 7/2009 | Shukla et al. | 717/105 |
| 7,574,659 B2* | 8/2009 | Szabo | 715/738 |
| 7,581,206 B2* | 8/2009 | Saad et al. | 717/106 |
| 7,596,418 B2 | 9/2009 | Bugosh | |
| 7,624,349 B2 | 11/2009 | Seemann et al. | |
| 7,629,985 B2 | 12/2009 | McArdle et al. | |
| 7,640,496 B1* | 12/2009 | Chaulk et al. | 715/243 |
| 7,665,062 B1* | 2/2010 | Bauer et al. | 717/108 |
| 7,701,461 B2 | 4/2010 | Fouladi et al. | |
| 7,761,848 B1* | 7/2010 | Chaffin | 717/116 |
| 7,840,937 B1* | 11/2010 | Chiluvuri | 717/106 |
| 7,878,148 B2 | 2/2011 | Swenson et al. | |
| 8,024,721 B2* | 9/2011 | Matic | 717/163 |
| 8,091,069 B2* | 1/2012 | Rojer | 717/114 |
| 8,127,273 B2* | 2/2012 | Barsness et al. | 717/107 |
| 8,141,032 B2* | 3/2012 | Joo et al. | 717/104 |
| 8,418,131 B2* | 4/2013 | Emmelmann | 717/111 |
| 2002/0030689 A1 | 3/2002 | Eichel et al. | |
| 2002/0039101 A1 | 4/2002 | Fernandez et al. | |
| 2003/0031371 A1 | 2/2003 | Kato et al. | |
| 2003/0167213 A1 | 9/2003 | Jammes et al. | |
| 2003/0226116 A1 | 12/2003 | Kuwata et al. | |
| 2004/0109563 A1 | 6/2004 | Evans et al. | |
| 2004/0162845 A1 | 8/2004 | Kim et al. | |
| 2004/0174998 A1 | 9/2004 | Youatt et al. | |
| 2004/0239679 A1 | 12/2004 | Ito et al. | |
| 2005/0024372 A1 | 2/2005 | Horton | |
| 2005/0081161 A1 | 4/2005 | MacInnes et al. | |
| 2005/0088447 A1 | 4/2005 | Hanggie et al. | |
| 2005/0125747 A1 | 6/2005 | Nelson et al. | |
| 2005/0237335 A1 | 10/2005 | Koguchi et al. | |
| 2005/0267721 A1 | 12/2005 | Thalhammer-Reyero | |
| 2006/0039674 A1 | 2/2006 | Sonoda et al. | |
| 2006/0072164 A1 | 4/2006 | Kato et al. | |
| 2006/0098023 A1 | 5/2006 | Coulthard | |
| 2006/0101431 A1 | 5/2006 | Pepin et al. | |
| 2006/0164414 A1 | 7/2006 | Farinelli | |
| 2006/0176316 A1 | 8/2006 | Nagasaki et al. | |
| 2006/0232583 A1 | 10/2006 | Petrov et al. | |
| 2006/0242164 A1 | 10/2006 | Evans et al. | |
| 2006/0253214 A1 | 11/2006 | Gross | |
| 2006/0294125 A1 | 12/2006 | Deaven | |
| 2007/0018990 A1 | 1/2007 | Shreiner | |
| 2007/0018996 A1 | 1/2007 | Wang et al. | |
| 2007/0060345 A1 | 3/2007 | Edwards | |
| 2007/0083805 A1 | 4/2007 | Randazzo et al. | |
| 2007/0165035 A1 | 7/2007 | Duluk, Jr. et al. | |
| 2007/0195085 A1 | 8/2007 | Farinelli | |
| 2007/0233678 A1 | 10/2007 | Bigelow | |
| 2007/0268297 A1 | 11/2007 | Novosad | |
| 2008/0088630 A1 | 4/2008 | Bakalash et al. | |
| 2008/0091491 A1 | 4/2008 | Thorpe et al. | |
| 2008/0266296 A1 | 10/2008 | Ramey et al. | |
| 2009/0073187 A1 | 3/2009 | Rampson et al. | |
| 2009/0138113 A1 | 5/2009 | Hoguet | |
| 2009/0160856 A1 | 6/2009 | Hoguet | |
| 2009/0180149 A1 | 7/2009 | Drake et al. | |
| 2009/0222469 A1 | 9/2009 | Maillot et al. | |
| 2009/0251478 A1 | 10/2009 | Maillot et al. | |
| 2009/0254611 A1 | 10/2009 | Pena et al. | |
| 2009/0265301 A1 | 10/2009 | Chen et al. | |
| 2010/0046846 A1 | 2/2010 | Brown | |
| 2011/0161054 A1 | 6/2011 | Woolf et al. | |

OTHER PUBLICATIONS

Fukuda et al, "Bayesian X ray computed tomography using material class knowledge", IEEE, pp. 2126-2129, 2010.*

Chen et al, "Signature file hierarchies and signature graphs: a new index method for object oriented databases", ACM SAC, pp. 724-728, 2004.*

Jung et al, "FRASH: Exploiting storge class memory in hybrid file system for hierarchical storage", ACM Trans. on Storage, vol. 6, No. 1, article 3, pp. 1-25, 2010.*

Office Action dated Aug. 6, 2009 for German Pat. App. No. 102009007334.5.

English Translation of Office Action dated Aug. 6, 2009 for German Pat. App. No. 102009007334.5.

"Bildsynthese" (German), Wikipedia, available at http://de.wikipedia.org/wiki/Bildsynthese, Aug. 2009.

"Grafikpipeline" (German), Wikipedia, available at http://de.wikipedia.org/wiki/Grafikpipeline, Aug. 2009.

"Textur (Computergrafik)" (German), Wikipedia, available at http://de.wikipedia.org/wiki/Textur_(Computergrafik)., Aug. 2009.

"Texture Mapping" (German), Wikipedia, available at http://de.wikipedia.org/wiki/Texture_Mapping, Aug. 2009.

"Image Synthesis," English Translation of "Bildsynthese" (German), Aug. 2009.

"Graphics Pipeline," English Translation of "Grafikpipeline" (German), Aug. 2009.

"Texture (Computer Graphics)," English Translation of "Textur (Computergrafik)" (German), Aug. 2009.

"Texture Mapping," English Translation of "Texture Mapping" (German), Aug. 2009.

"Mental Mill Functional Overview," Mental Images GmbH, White Paper, Feb. 11, 2007 (15 pages).

Office action dated Jan. 27, 2012 for U.S. Appl. No. 12/259,205.

Office Action in U.S. Appl. No. 12/040,725 mailed Jun. 7, 2011.

Final Office Action dated Jul. 19, 2012 for U.S. Appl. No. 12/259,205.

Non-Final Office Action for U.S. Appl. No. 12/040,659 dated Feb. 10, 2011.

Non-Final Office Action for U.S. Appl. No. 12/040,725 dated Sep. 11, 2012.

Final Office Action for U.S. Appl. No. 12/250,458 dated Feb. 3, 2012.

Non-Final Office Action for U.S. Appl. No. 12/250,460 dated Sep. 14, 2012.

Non-Final Office Action for U.S. Appl. No. 12/187,332 dated Oct. 26, 2012.

* cited by examiner

SYSTEM FOR LIBRARY CONTENT CREATION

BACKGROUND OF THE INVENTION

1. Field of the Invention

The present invention generally relates to computer software. More specifically, the present invention relates to a system for library content creation.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable two-dimensional (2D) or three-dimensional (3D) construct. Initially, such a construct is defined in part by the regions making up the surface of that construct. A rendering application may be used to add detail to the construct by mapping material texture maps onto various regions of the construct.

Material texture maps, or materials, can be defined according to a variety of parameters, generally related to the type of material represented. For example, a glass material may be defined in part by a reflectivity parameter, while a concrete material may be defined in part by a coarseness parameter. A user of a rendering application may change the values of some or all of these parameters to modify the physically and/or display characteristics of the rendered material. Users of various rendering applications may apply materials to 2D or 3D constructs in different ways according to their specific needs. For example, an architect may use a hardwood floor material as an indoor floor surface and a grass material as an outdoor floor surface; alternatively, a video game designer may use either material for a variety of purposes within a virtual environment.

A problem exists with current systems for organizing materials in a material library. A material library may include material classes, instances of those material classes, various user interface files configured to present the user with different versions of a user interface for modifying parameters of the materials, various rendering implementation that allow the material to be rendered using different rendering technology, and other types of files. Conventional organizational schemes for such a large amount of diverse data are difficult to manage. In particular, conventional data libraries are not sufficient for organizing different types of information because the different types of data cannot typically be stored together.

A second problem exists in efficiently manipulating and updating different data types stored in various databases because different data types require different software tools, each having different inputs and outputs, for such purposes.

As the foregoing illustrates, there remains a need in the art for an organizational structure that overcomes the problems set forth above.

SUMMARY OF THE INVENTION

Embodiments of the invention set forth a method for generating a library of materials that can be applied to geometry in a graphics scene when performing rendering operations. The method includes generating a class file that includes material parameters representing rendering characteristics of a material class and generating a library root file that includes a reference to the class file. The method further includes generating a rendering implementation file for translating values of the material parameters into a format recognized by a particular rendering engine and generating a user interface file that includes at least one user interface configured to allow a user to modify the values of the material parameters. The method also includes linking the class file to the library root file, and linking the rendering implementation file and the user interface file to the class file.

Advantageously, data comprised of heterogeneous data types can be organized and updated in the library more effectively when compared to prior art techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
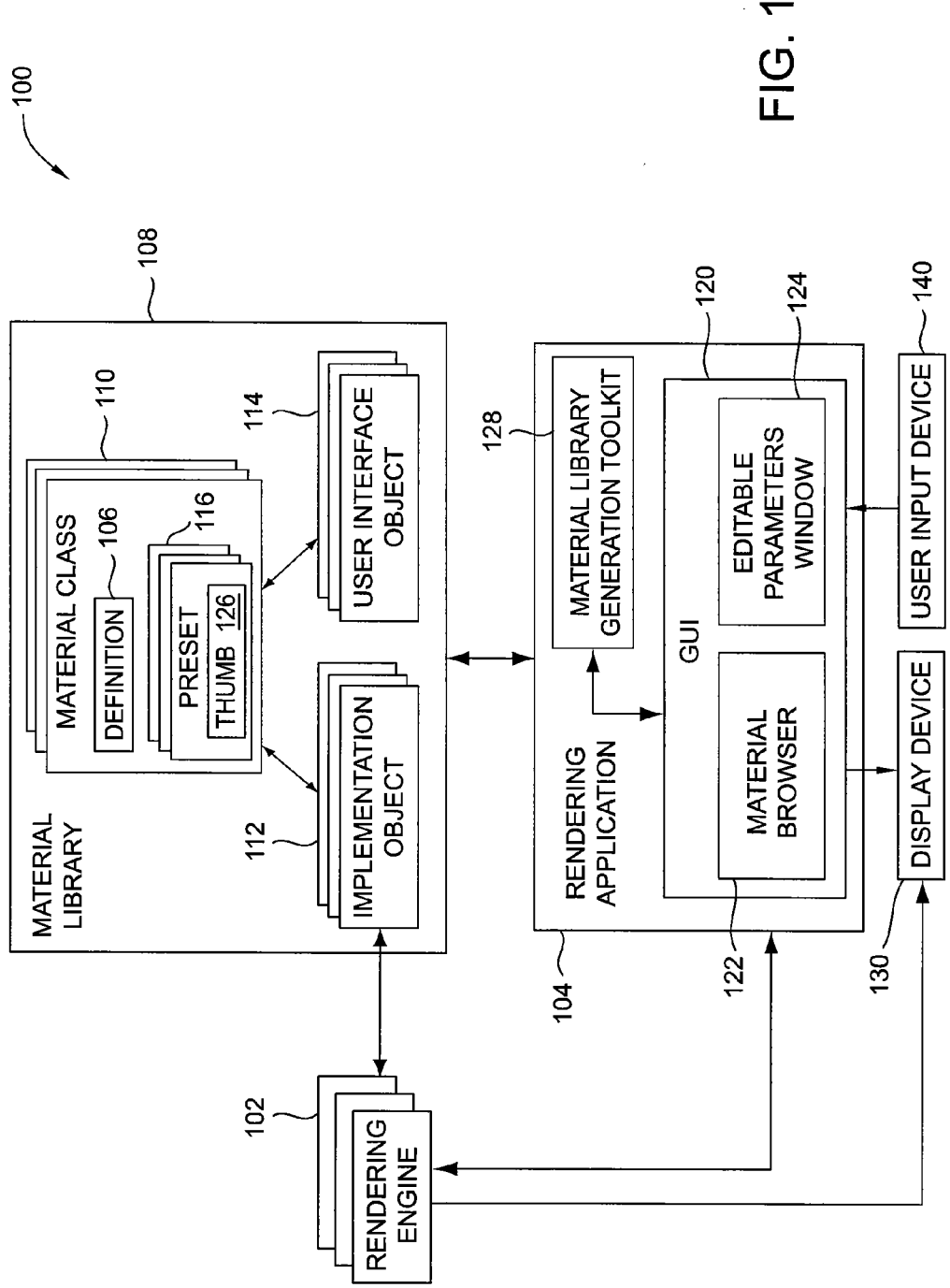
FIG. 1 is a block diagram of a system configured to implement one or more aspects of the invention.

FIG. 1 is a block diagram of a system 100 configured to implement one or more aspects of the invention. The components illustrated in FIG. 1 may include computer software applications executing on existing computer systems, e.g., desktop computers, server computers, laptop computers, tablet computers, video game consoles, and the like. The software applications described herein, however, are not limited to any particular computer system and may be adapted to take advantage of new computer systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user interface (GUI) 120 may include a software program executing on a client computer system at one physical location communicating with a rendering application 104 at another physical location. Also, in one embodiment, the rendering application 104 and the GUI 120 may be provided as an application program (or programs) stored on computer readable storage media such as a CD-ROM, DVD-ROM, flash memory module, or other tangible storage media.

As shown, the computer system 100 includes, without limitation, one or more rendering engines 102, the rendering application 104, a material library 108, a display device 130, and a user input device 140. Each rendering engine 102 is configured to allow users interacting with the GUI 120 to render a graphics scene and display the rendered images on the display device 130. In one embodiment, each rendering engine 102 may be configured with one or more rendering engine implementations. For example, a first rendering engine may include a first rendering implementation and a second rendering implementation. The first rendering implementation may provide a low-quality, high-speed rendering implementation. The first rendering implementation may be appropriate when rendering in real-time, e.g., to give the user a quick impression of the appearance of the rendered scene. The second rendering implementation may be a high-quality, low-speed rendering implementation. The second rendering implementation may be appropriate when rendering a final version of a scene, giving more fine-grained results.

As shown, the material library 108 includes one or more material classes 110, one or more implementation objects 112, and one or more user interface objects 114. The material library 108 may be located within any memory subsystem within the computer system 100 or on a machine remote to the computer system 100. In certain embodiments, the material library 108 may be distributed across memory locations within the computer system 100 or between the computer system 100 and a machine remote to the computer system 100. In other embodiments, the material library 108 is generated based on a hierarchical collection of files, such as Extensible Markup Language (XML) files, that is compiled into executable code.

Each material class 110 may include a material definition 106 and one or more material presets 116. The material definition 106 includes provides a template having a global set of appearance attributes, referred to herein as "material parameters," that can be shared by a set of similar materials. A preset 116 is an "instance" of the material class 110, where each material parameter of the material class 110 is assigned a specific value. For a particular material class 110, the material library 108 may include hundreds of material presets 116, each having a unique set of values for the material parameters associated with that particular material class 110. Each preset 116 may include a thumbnail 126, which provides a preview of a rendered version of the preset 116. Additionally, the values of the material parameters associated with the preset 116 may be modified by a user of the rendering application 104, thereby adjusting the result of rendering the preset 116.

The material classes 110 may include data for presets 116 that corresponds to lights, animation data, simulation data, display properties of the preset 116, physical properties of the preset 116, and the like. For example, each construct in a graphics scene may be composed of one or more pieces of geometry, e.g., a collection of triangles or polygons, to which presets 116 are applied when rendering the construct. Common examples of material classes 110 include a painted wall material class, a concrete material class, a metal material class, a glass material class, and a water material class, among others. In alternative embodiments, the material classes 110 may define volumetric materials, such as fire, smoke, clouds, 3D shapes, and the like.

The material parameters may include color, grain, reflectivity, coarseness, or any other parameters that convey the physical and/or display characteristics of the material class 110. For example, a brick material class may include height, width, and grout thickness parameters; whereas, a wall paint material class may include color and finish parameters. When a developer creates a material class 110, the developer designates one or more of the material parameters as being "editable," meaning that these material parameters may be exposed to the user so that the user can modify the values of these material parameters to alter the appearance of the preset 116 when applied to a construct in a scene. In one embodiment, the developer may implement different versions of the same material class 110 by exposing different sets of editable material parameters to the user.

Each material class 110 may include strongly-typed parameters representing the relevant characteristics of a given material. Because the parameters of the graphics asset are strongly-typed, users of the rendering application 104 can easily identify the characteristics to use in rendering or simulating a given preset 116. The specific parameters for the preset 116 corresponding to an underlying rendering engine 102, simulation engine, or animation engine need not be known to the user.

The user interface objects 114 present the user with the appropriate user interface constructs used for manipulating the values of the material parameters. In one embodiment, different user interface objects 114 are associated with the same material class 110 based on the rendering application 104 involved. For example, continuing with the example of the wall paint material class 110, the user interface object 114 may present the user a color type parameter using interface elements that allow a user to specify red, green, and blue (RGB) color values, a code reference to a manufacturer catalog, or even sampled spectral values. The user interface objects 114 may also present the user with drop-down lists for the application type and finish parameters. These drop-down lists could present values for a painted surfed familiar to an architect or designer, such as rolled, sprayed, brushed, matte, glossy, satin, etc. By decoupling the user interface from the material class 110, the system 100 enables different rendering applications 104 to adapt the user interface to the skills of the particular user. For example, a typical Autodesk® Revit® user will prefer to enter colors from a catalog while an Autodesk® 3ds Max® user may prefer to enter RGB values. Thus, a different user interface object 114 is associated with the material class 110 based on this preference.

Implementation objects 112 provide an interface between the material class 110 and a particular rendering engine 102. Generally, the implementation objects 112 are configured to receive values for the strongly-typed parameters and also to translate these values into an appropriate format for use with one of the rendering engines 102 to achieve a desired rendering effect. The translation may be a simple pass-through, such as in the case of passing of RGB color values, but can also be a mapping from one value to another. That is, depending on the desired rendering effect, the underlying implementation object 112 may generate multiple parameters from a single material parameter, may identify libraries, files, shader programs, textures, rendering parameters, or any other values used by a particular rendering engine 102 to achieve a desired effect. By decoupling the rendering engine 102 from the material class 110, the material library 108 may be extended with additional rendering engines 102 by adding the appropriate implementation object 112 for each additional rendering engine 102. Further, the material library 108 is also designed to be easily extended with new material classes 110 for existing rendering engines 102 by simply creating an additional implementation object 112 and material class 110 pairing.

In addition to extending the material library 108 to render material classes 110, the system 100 applies to extending a simulation application or an animation application. For example, physical properties of material classes 110 may be matched to several simulation engines, including multiple fluid simulators. A first fluid simulator may be optimized for speed, and a second fluid simulator may be optimized for correctness.

As shown, the rendering application 104 includes the GUI 120 and a material library generation toolkit 128. The GUI 120 includes a materials browser 122 and an editable parameters window 124. The material browser 112 presents some or all of the presets 116 in the material library 108 that may be applied to a particular construct. In one embodiment, when a preset 116 is selected, the editable parameters of the preset 116 may be displayed in the editable parameters window 124. A user may interact with GUI elements in the editable parameters window 124 to modify the physical and/or display characteristics of the selected preset 116.

The GUI 120 and the rendered output of the rendering engines 102 may be displayed to the user via the display device 130. The display device 130 may be a CRT or LCD display or any other type of display device. Input is received from the user via the user input device 140, which may be a mouse pointing device, a keyboard, a joystick, a video game controller, or any other type of user input device.

Figure 2:
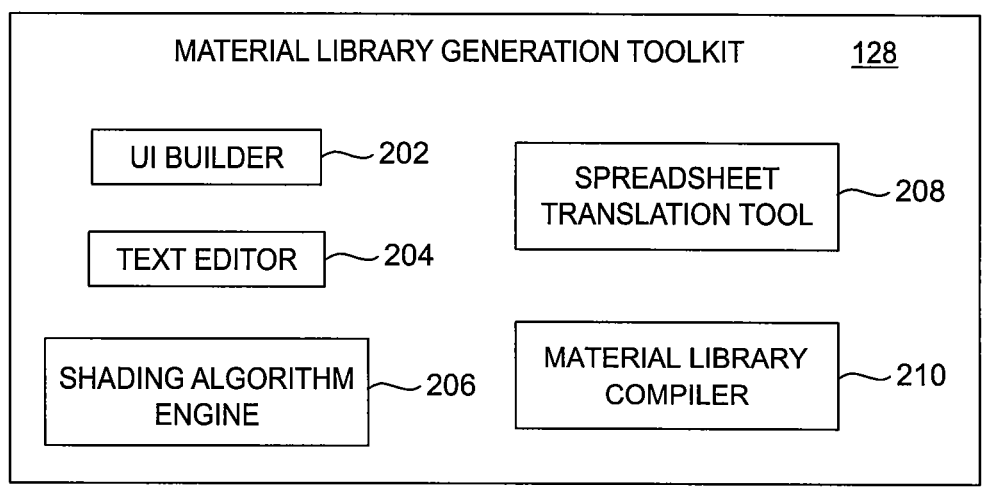
FIG. 2 is a conceptual diagram illustrating components included in a material library generation toolkit, according to one embodiment of the invention.

The material library generation toolkit 128, described in greater detail in FIG. 2, includes one or more software tools that may be used to generate the material classes 110, implementation objection 112, and user interface objects 114 included in the material library 108. In one embodiment, the rendering application 104 comprises each of the software tools included in the material library generation toolkit 128. In alternative embodiments, one or more of the tools included in the material library generation toolkit 128 are separate and distinct software applications apart from the rendering application 104.

FIG. 2 is a conceptual diagram illustrating the components included in the material library generation toolkit 128, according to one embodiment of the invention. As shown, the material library generation toolkit 128 includes, without limitation, a user interface (UI) builder 202, a text editor 204, a shader algorithm engine 206, a spreadsheet translation tool 208, and a material library compiler 210.

The UI builder 202 is a software tool that provides a GUI through which developers may create a custom UI for a particular material class 110. The UI builder 202 may provide the developer the ability to "drag-and-drop" UI elements, such as numerical input fields, sliders, drop-down menus, and the like, to create the UI. The UI builder 202 also provides the user the ability to compile the UI into a user interface object 114 that can be added to the material library 108. In one embodiment, the compiled user interface object 114 comprises an XML file.

The text editor 204 is a software tool that allows the developer to write programming code and is configured to compile the programming code into an XML file. The text editor 204 may support the XML programming language. In one embodiment, the text editor 204 is used by the developer to generate XML files that provide a "linking" between the material objects 110, the presets 116, the implementation objects 112, and the user interface objects 114 included in the material library 108. In other embodiments, the implementation objects 112 may be directly programmed by the developer in XML using the text editor 204. Similarly, the material definition 106, which define the editable parameters of the material class 110, may also be directly programmed by the developer in XML using the text editor 204.

The shader algorithm engine 206 is a software tool that can compile a procedural shader into an implementation object 112. As is known, shaders comprise a set of software instructions, e.g., in OpenGL or High Level Shader Language (HLSL), used that represent a rendering effect. The developer may use the shading algorithm engine 206 to automatically generate the material definitions 106 based on these procedural shaders, instead of manually programming the implementation objects 112 using the text editor 204, as described above.

The spreadsheet translation tool 208 is a software tool that can translate a spreadsheet file into an XML file to be included in the material library 108. In one embodiment, the parameter values corresponding to each of the presets 116 included in the material library 108 are stored in one or more spreadsheet files. Each column of the spreadsheet may corresponds to a particular editable parameter of a particular material class 110, and the values within the rows of the spreadsheet file may correspond to the parameter values for a particular preset 116. The spreadsheet translation tool 208 is configured to parse one or more spreadsheet files to generate one or more corresponding XML files to be included in the material library 108. For example, in the case of a wall paint material class, the material library 108 may include hundreds of presets 116, each with different values of the parameters of the wall paint material class. The spreadsheet translation tool 208 is configured to parse this wall paint preset spreadsheet file to generate XML files that can be included in the material library 108. Additionally, if a developer wishes to modify the value of one or more of the presets 116 in a similar fashion (e.g., increase double the value of a "brightness" parameter for each preset 116), the developer may execute a spreadsheet editor application, such as Microsoft® Excel®, to modify the values of the one or more presets. This modification may be easily performed by applying a global or semi-global operation to one or more columns or rows of the spreadsheet file. The spreadsheet translation tool 208 is configured to parse this modified spreadsheet file to generate the one or more XML files to be included in the material library 108.

The material library compiler 210 is a software tool configured to parse the one or more XML files generated by the UI builder 202, the text editor 204, the shading algorithm engine 206, and/or the spreadsheet translation tool 208 to generate executable code corresponding to the material library 108. In one embodiment, the executable code is shipped with the rendering application 104. In alternative embodiments, when incremental updates are ready to be added to the material library 108, e.g., adding an additional material class 110, then the material library compiler 210 may be configured to re-compile the XML files, including any additional XML files, to generate an updated executable file that represents the material library 108. In alternative embodiments, the material library compiler 210 may be configured to generate more than one executable file representing the material library (e.g., when a single executable file is too large in size to be manageable).

Figure 3:
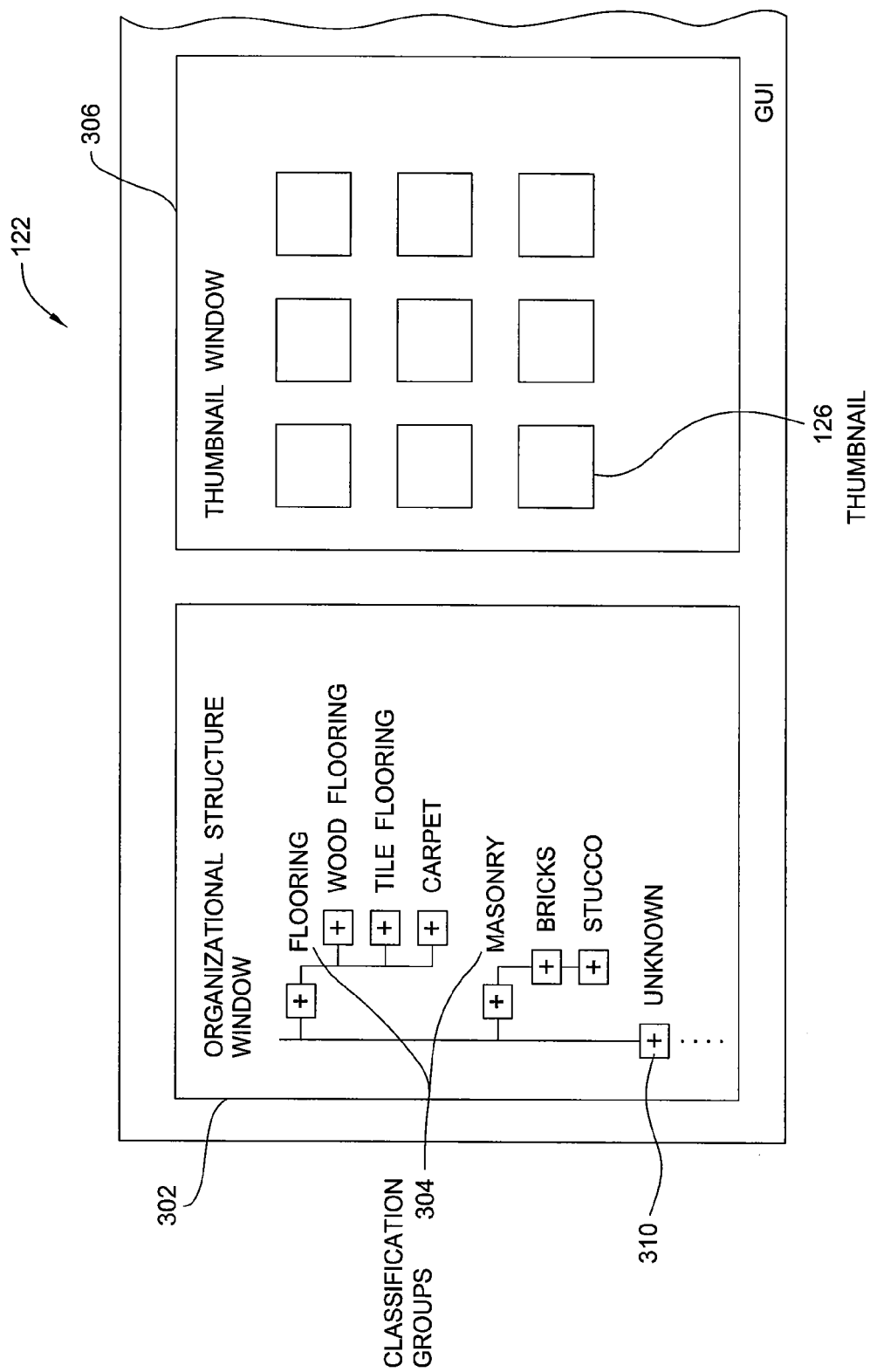
FIG. 3 is a conceptual diagram representing a material browser configured to display an organizational structure of a set of material presets included in a material library, according to one embodiment of the invention.

FIG. 3 is a conceptual diagram representing a material browser 122 configured to display an organizational structure of a set of material presets 116 included in the material library 108, according to one embodiment of the invention. As shown, the material browser 122 includes an organizational structure window 302 and a thumbnail window 306. In one embodiment, the rendering application 104 may be configured to display to the user only some of the presets 116 available in the material library 108. The presets 116 that are not exposed may be not relevant to users of the particular rendering application 104 and/or are not relevant to users with a certain rendering expertise.

The organizational structure of the exposed presets 116 is displayed in the organizational structure window 302. The user may inspect the contents of each level of the organizational structure by selecting with a mouse, or otherwise indicating with another user input device 140, a specific classification group 304. The rendering application then causes the contents of the selected classification group 304, which, in different embodiments, may include either the names of the presets 116 belonging to that classification group or additional lower-level classification groups 304 found within a higher-level classification group 304, to be displayed to the user. In one embodiment, a material class 110 may include sub-classes that define the different levels of classification groups 304 displayed in the organizational structure window 302.

A preset 116 may be located by a user in the organizational structure by selecting any of the classification groups 304 to which the preset 116 belongs. For example, an oak hardwood floor preset that belongs to both a "flooring" classification group and a "wood flooring" classification group may be found by selecting either classification group.

The rendering application 104 is also configured to cause thumbnails 126 of the presets 116 belonging to the selected classification group(s) 304 to be displayed to the user in a thumbnail image window 306, optionally with the names of each presets 116. The user may then select a specific preset 116 to apply to a construct within the graphics scene by selecting the thumbnail 126 associated with the preset 116 with a mouse or otherwise indicating with another user input device 140. In one embodiment, the thumbnails 126 are automatically generated by the rendering application 104 based on the values of the material parameters, the associated material definition 106, and the associated implementation object 122.

Figure 4:
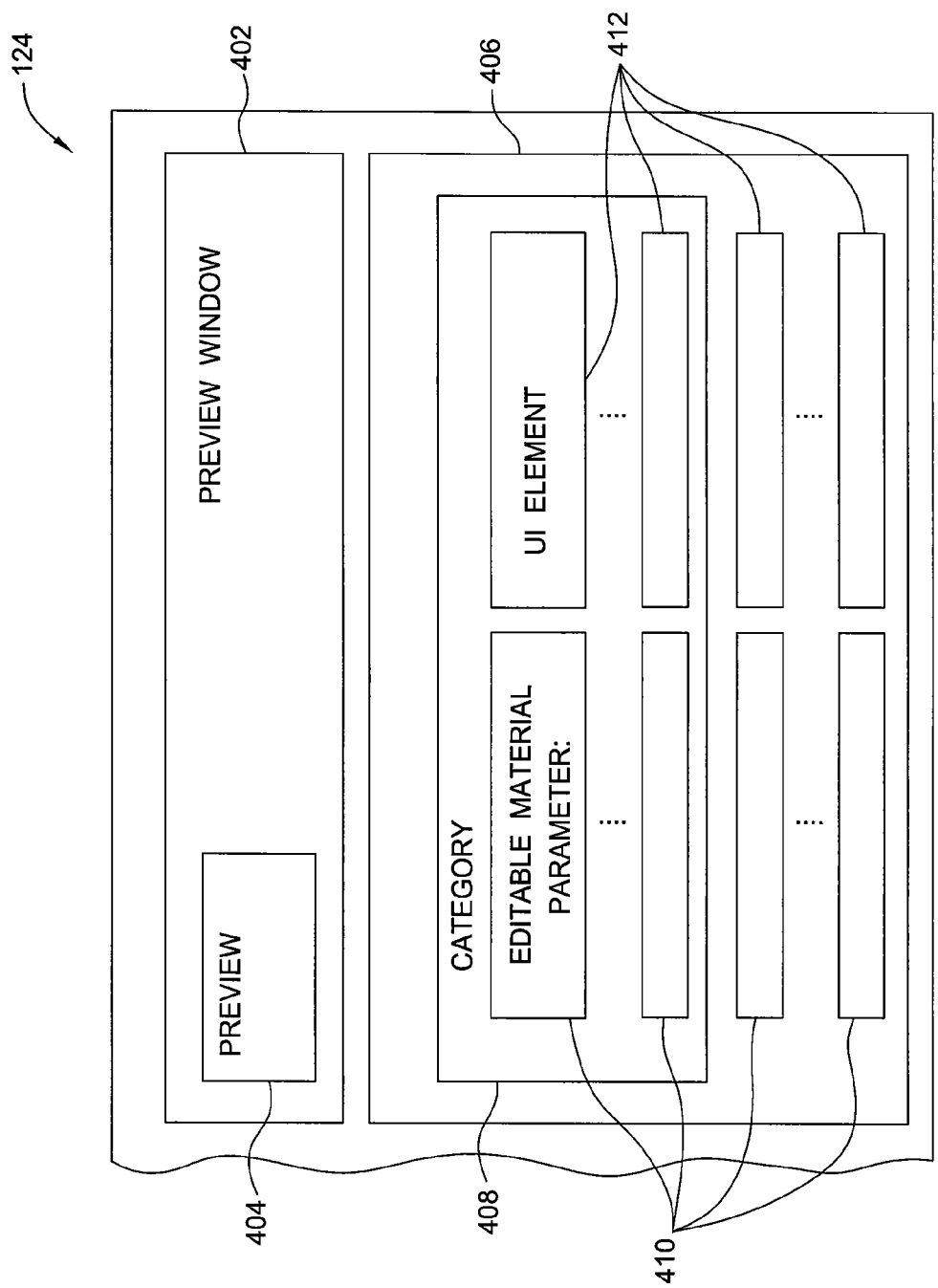
FIG. 4 is a conceptual diagram representing an editable parameters window configured to enable a user to edit the physical and/or display properties of a selected preset, according to one embodiment of the invention.

FIG. 4 is a conceptual diagram representing an editable parameters window 124 configured to enable a user to edit the physical and/or display properties of a selected preset 116, according to one embodiment of the invention. As described herein, the user may select one of the exposed presets 116 that is available in the material browser 122 by selecting the associated thumbnail 126. After the preset 116 has been selected, the rendering application 104 is configured to cause a preview 404 of the preset 116 to be displayed to the user in a preview window 402. In one embodiment, metadata associated with the preset 116 specifies whether such a preview 404 should be displayed. The rendering application 104 also causes editable material parameters 410 for the preset 116 to be exposed to the user via a parameters window 406 and configures the parameters window 406 with the implemented user interface elements (UI elements) 412 corresponding to the exposed editable material parameters 410.

As shown, in various embodiments, related editable material parameters 410 and their corresponding UI elements 412 may be organized and displayed in a category 408. For example, a "color" category may include three editable parameters corresponding to red, green, and blue (RGB) color values as well as an editable transparency parameter and an editable contrast parameter. As a category, these five editable parameters and their corresponding UI elements may be displayed together in a specific area of the parameters window 406. In addition, based on metadata associated with the preset 116, some of the editable material parameters 410 belonging to a particular category 408 may be displayed, while other editable material parameters 410 in the category 408 may be suppressed. For example, the color parameters in a color category may be displayed, while the contrast and transparency parameters in that category may be suppressed. In one embodiment, the UI object 114 associated with the selected preset 116 defines the editable material parameters 410 and corresponding UI elements 412 that are to be displayed for the selected preset 116.

As previously described herein, the user may change the values of the editable material parameters 410 by manipulating the corresponding UI elements 412. When the editable material parameter values are changed, the rendering application 104 is configured to generate an updated preview 404 that reflects those changes and cause the updated preview 404 to be displayed to the user in the preview window 402. The user may then save the modified preset as a second version of the preset 116 via the material browser 122. In one embodiment, the second version of the preset 116 inherits the editable material parameters 410 and corresponding UI elements 412 from the original preset 116. The rendering application 104 is configured to place the second version of the preset 104 within the organizational structure according to the inherited data.

Figure 5:
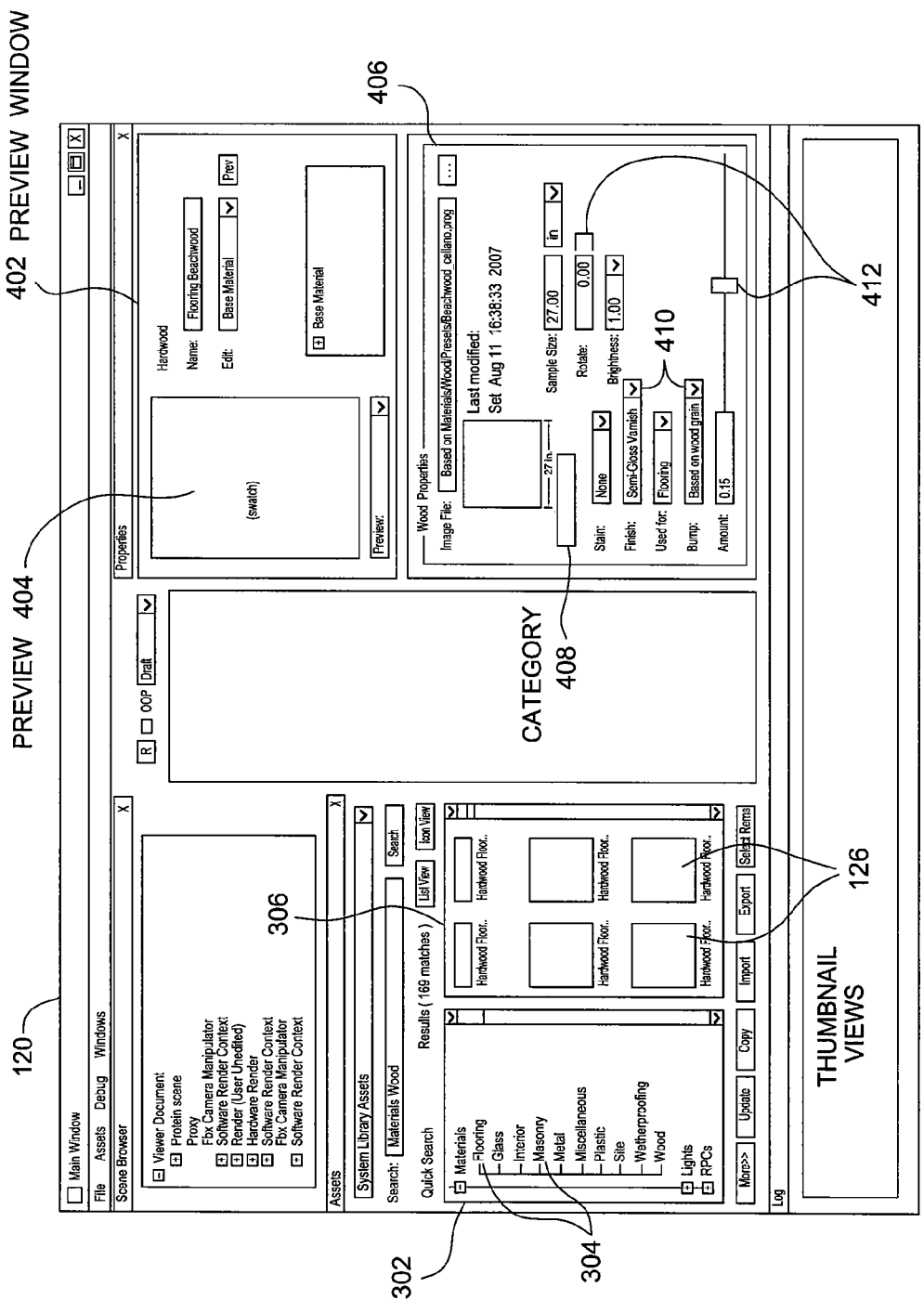
FIG. 5 is a screenshot of an exemplary graphical user interface for a selected preset, according to one embodiment of the invention.

FIG. 5 is a screenshot of an exemplary GUI 120 for a selected preset 116, according to one embodiment of the invention. The organizational structure window 302 is configured to display the organizational structure including only those presets 116 relevant to the particular rendering application 104. In one embodiment, selection of which presets 116 to make available to the user is based on user market segment, registry information, an environment variable, rendering expertise of the user, and the like. Thumbnails 126 of the exposed presets 116 belonging to a selected classification group 304 are displayed in the thumbnail window 306 of the GUI 120. Once the user selects a particular preset 116, the preview 404 of that preset 116 is displayed in the preview window 402 of the GUI 120. In one embodiment, the rendering application 104 selects a particular UI object 114 for the preset 116 based on certain configuration information. The configuration information may be metadata associated with (a) the rendering application 104, (b) an environment variable, (c) a file on disk, (d) a registry entry, or (e) or any data used for determining an environment or user type. The UI object 114 may specify the editable material parameters 410 and corresponding UI elements 412 to display to the user. The editable material parameters 410, the specific implemented GUI elements 412 used to modify the values of those editable material parameters 410, and the category 408, if any, to which one or more of the editable material parameters 410 belong, are displayed to the user within the parameters window 406 of the GUI 120.

Figure 6:
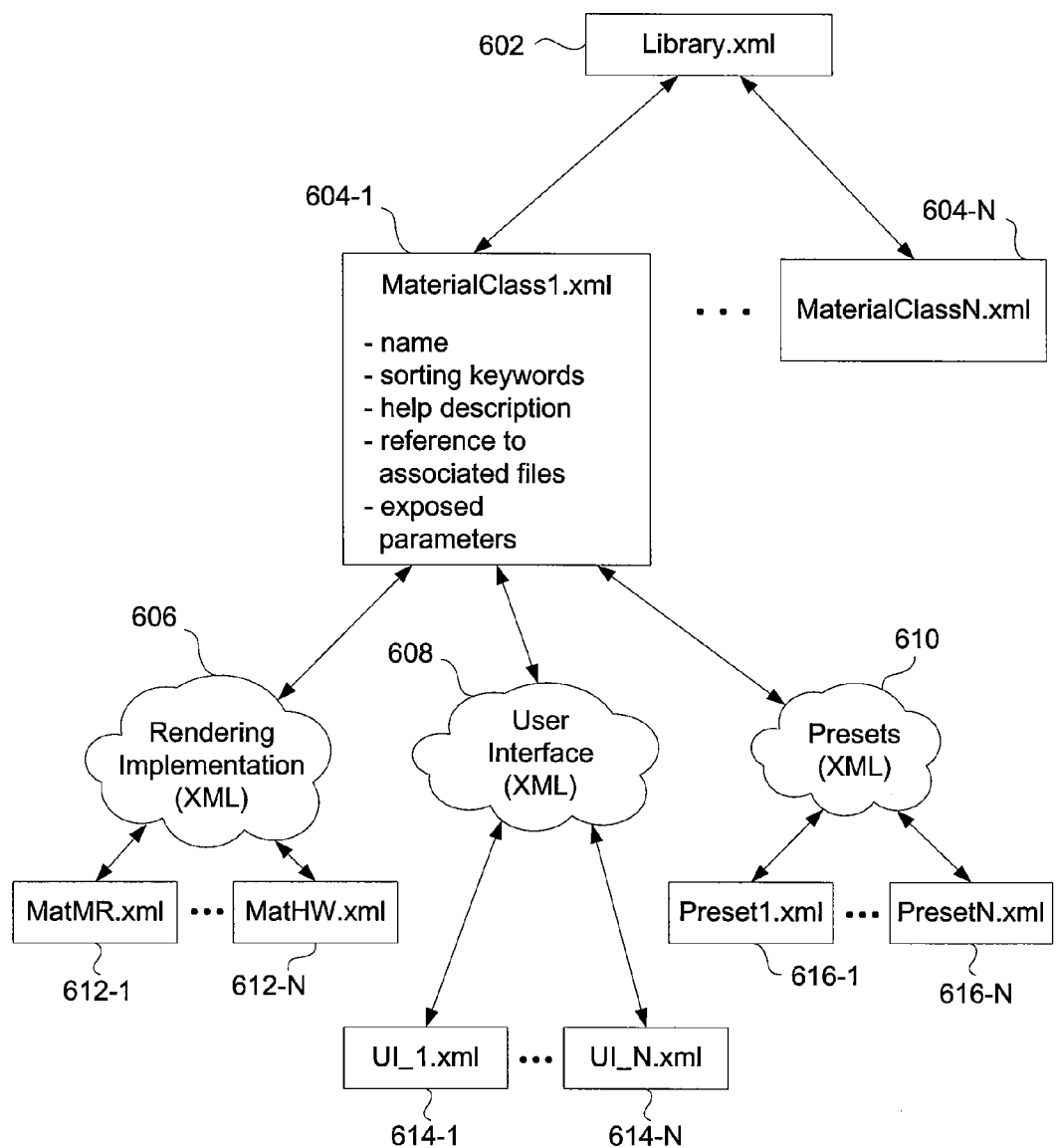
FIG. 6 is a conceptual diagram illustrating a file structure representing the material library 108, according to one embodiment of the invention.

FIG. 6 is a conceptual diagram illustrating a file structure 600 representing the material library 108, according to one embodiment of the invention. As shown, the file structure 600 is a hierarchical tree structure that includes a top level root file 602, material class files 604-1 to 604-N, a rendering implementation file structure 606, a user interface file structure 608, a preset file structure 610, rendering implementation files 612-1 to 612-N, user interface files 614-1 to 614-N, and preset files 616-1 to 616-N. In one embodiment, each of the files, including the files the file structures 606, 608, 610, is an XML file. In alternative embodiments, the files are not XML files, but rather can be files comprising any file type that can be configured to represent structured data.

The root file 602 is an XML file that provides a listing of each of the material classes 110 included in the material library 108. The root file 602 may be directly programmed by the developer using the text editor 204. As shown, the root file 602 references the material class file 604-1. The root file may also reference other material class files 604-N. Additionally, there may be an XML file structure that includes intermediary XML files (not shown) between the root file 602 and the material class files 604-1.

The material class file 604-1 provides a template having common parameters that can be shared by a set of similar presets 116. The parameters have commonly-understood names that refer to specific exposed parameters and measurable properties of the material class 110. For example, a "paint" material class may have two parameters, "color" and "finish." As described above, the presets 116 are "instances" of the material class 110, where each parameter of the material class is assigned a specific value. In one embodiment, the material class file 604-1 is XML file programmed by the developer using the text editor 204. In alternative embodiments, the material class file 604-1 is XML file generated by the shader algorithm engine 206. The material class file 604-1 provides references to the rendering implementation file structure 606, the user interface file structure 608, and the preset file structure 610.

The rendering implementation file structure 606 comprises one or more XML files programmed by the developer using the text editor 204. The rendering implementation file structure 606 provides references to the one or more rendering implementation files 612-1 to 612-N. The rendering implementation file structure 606 provides a linking, or "glue," between the material class file 604-1 and the rendering implementation files 612-1 to 612-N for a particular material class 110.

The rendering implementation files 612-1 to 612-N are XML files that provide a mapping between values of the material parameters and a format recognized by a particular rendering technology. A first rendering implementation files 612-1 may provide a mapping of values for a first rendering engine; whereas, a second rendering implementation files 612-N may provide a mapping of values for a second rendering engine. For example, the paint material class may be associated with rendering implementation files for rendering the paint material class using Mental Ray®, RenderMan®, a hardware renderer, or some other rendering engine. In one embodiment, the rendering implementation files are programmed directly by the developer using the text editor 204. Additionally, as new rendering engines are introduced, or existing rendering algorithms are improved, the developer can update the rendering implementation files included in the file structure 600.

The user interface file structure 608, similar to the rendering implementation file structure 606, comprises one or more XML files programmed by the developer using the text editor 204. The interface file structure 608 provides references to the user interface files 614-1 to 614-N and provides a linking, or "glue," between the material class file 604-1 and the user interface files 614-1 to 614-N for a particular material class 110.

The user interface files 614-1 to 614-N are XML files that define a user interface for a material class 110. In one embodiment, the UI builder 202 generates the user interface files 614-1 to 614-N. Each user interface file 614-1 to 614-N may provide a different user interface for a particular material class, based on various configuration information, as described above The preset file structure 610, similar to the rendering implementation file structure 606 and the user interface file structure 608, comprises one or more XML files programmed by the developer using the text editor 204. The preset file structure 610 provides references to preset files 616-1 to 616-N and provides a linking, or "glue," between the material class file 604-1 and the rendering preset files 616-1 to 616-N for a particular material class 110.

The preset files 616-1 to 616-N comprise one or more XML files that include metadata corresponding to the presets 116 included in the material library 108 for a particular material class 110. In one embodiment, the preset files 616-1 to 616-N are generated by the spreadsheet translation tool 208, which is configured to translate the spreadsheet file, which includes values for the parameters associated with various presets 116, into the preset files 616-1 to 616-N.

Once the file structure 600 is created, the material library compiler 210 is configured to parse the XML files included in the file structure 600 to generate an executable representing the material library 108. The executable may be shipped with the rendering application 104. Additionally, when incremental updates are ready to be added to the material library 108, e.g., adding an additional material class 110, then the material library compiler 210 may be configured to re-compile the XML files included in the file structure 600, including any additional XML files, to generate an updated executable that represents the material library 108. If the material library compiler 210 detects that improper references are made in the file structure 600, e.g., a particular XML file references a location that does not include the referenced XML file, then the material library compiler 210 is configured to return an error message. In alternative embodiments, the material library compiler 210 may be configured to generate more than one executable representing the material library (e.g., when a single executable file is too large in size to be manageable).

According to embodiments of the invention, additional material class files, rendering implementation files, user interface files, and preset files may be added to the file structure 600 as they are created, and existing files may be edited as needed. As long as the various inputs and output of each portion of the hierarchy are adhered to when adding and/or updating the files, the developer can more easily update the material library 108, when compared to prior art techniques. Additionally, since the file structure 600 is segmented into "branches" (e.g. a rendering implementation branch, a user interface branch, and a presets branch), members of a team of developers can each work to develop different portions of the file structure 600 without interfering with other developers.

Figure 7:
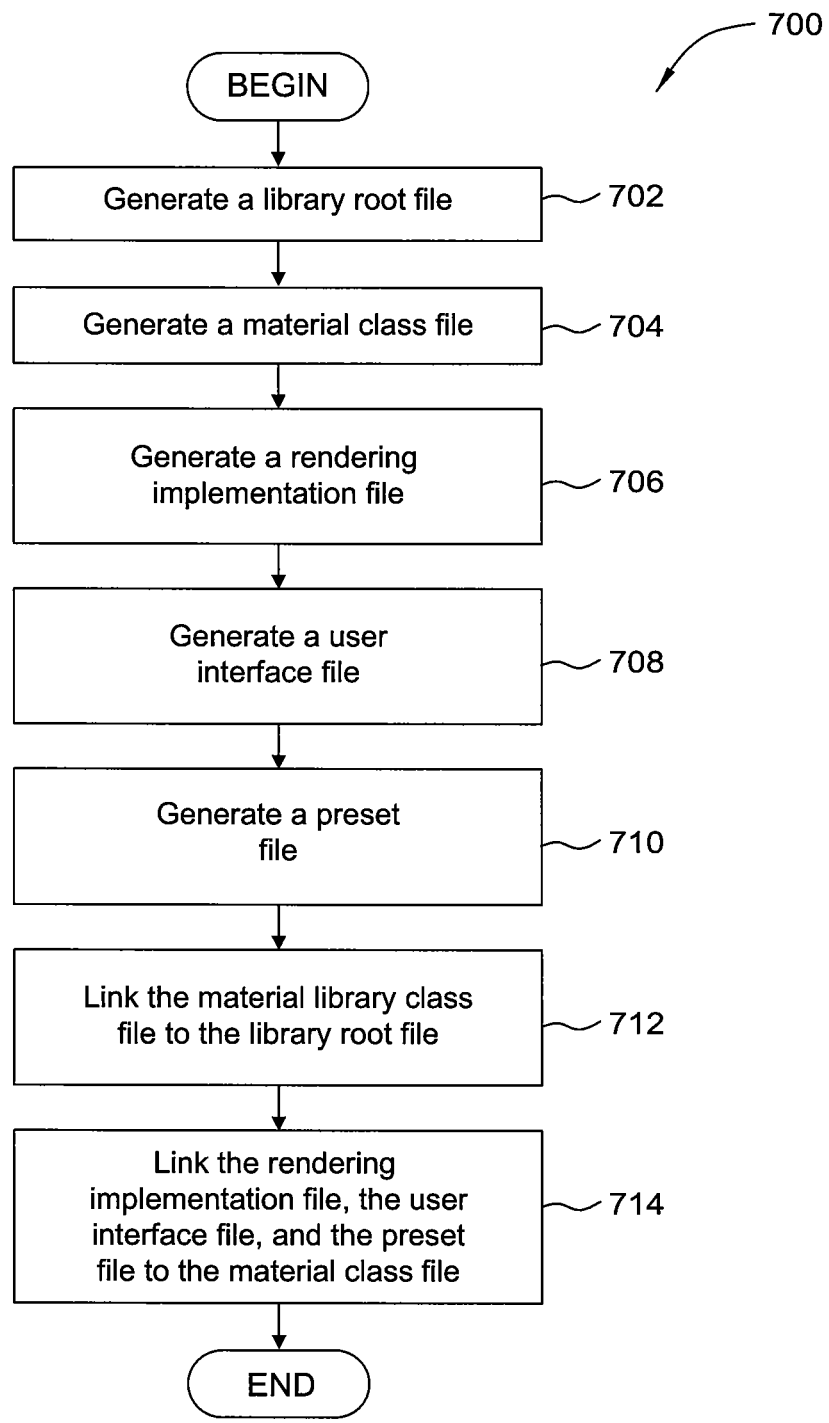
FIG. 7 is a flow diagram of method steps for generating the file structure that represents a material library, according to one embodiment of the invention.

FIG. 7 is a flow diagram of method steps for generating a file structure 600 that represents a material library 108, according to one embodiment of the invention. Persons skilled in the art will understand that, even though the method 700 is described in conjunction with the systems of FIGS. 1-6, any system configured to perform the method steps, in any order, is within the scope of the invention.

As shown, the method 700 begins at step 702, where the developer generates a library root file 602. The library root file 602 is an XML file that may be programmed by the developer using the text editor 204. The library root file 602 may contain references to various material class files to be included in the file structure 600.

At step 704, the developer generates the material class file 602. The material class file 602 is an XML file that includes the names, the sorting keywords, descriptions, editable parameters, and reference pointers to all other files associated with the material class file 602. In one embodiment, the material class file 602 is generated by the developer by programming the material class file 602 using the text editor 204. In alternative embodiments, the material class file 602 is generated by the shading algorithm engine 206 based on a procedural shader.

At step 706, the developer generates a rendering implementation file. The rendering implementation file is an XML file that provides a translation between the values of material parameters associated with a material class into a format recognized by a particular rendering technology. In one embodiment, the rendering implementation file is generated by the developer programming the rendering implementation file using the text editor 204. As described herein, additional rendering implementation files may be generated, each providing a translation to additional rendering technologies and/or rendering engines.

At step 708, the developer generates a user interface file. The user interface file is an XML file that provides a GUI for a user of the rendering application 104 to modify the values of the parameters of a preset 116 when applying the preset 116 to a construct in the graphics scene. The developer may generate additional user interface files for the same material class 110, as described above. In one embodiment, the developer generates the user interface file by executing the UI builder 202 software tool included in the material library generation toolkit 128.

At step 710, the developer generates a preset file. The preset file is an XML file that includes values for the parameters associated with one or more presets 116. The preset file may also include references to additional preset files that include the values associated with additional presets 116. In one embodiment, the developer generates the preset file by executing the spreadsheet translation tool 208 included in the material library generation toolkit 128, which is configured to translate a spreadsheet file into one or more preset files.

At step 712, the developer links the material class file to the library root file. In one embodiment, the developer may configure, using the text editor 204, the library root file 602 to reference the material class file 604-1 at a particular directory location within a computer system or network. At step 714, the developer links the rendering implementation file, the user interface file, and the preset file to the material class file 604-1. In one embodiment, the developer may configure, using the text editor 204, the material class file 604-1 to reference each of the rendering implementation file, the user interface file, and the preset file at a particular directory location within a computer system or network. In one embodiment, the referenced directory is the same for each of the rendering implementation file, the user interface file, and the preset file. In alternative embodiments, the references to the rendering implementation file, the user interface file, and the preset file comprise references to more than one directory.

Figure 8:
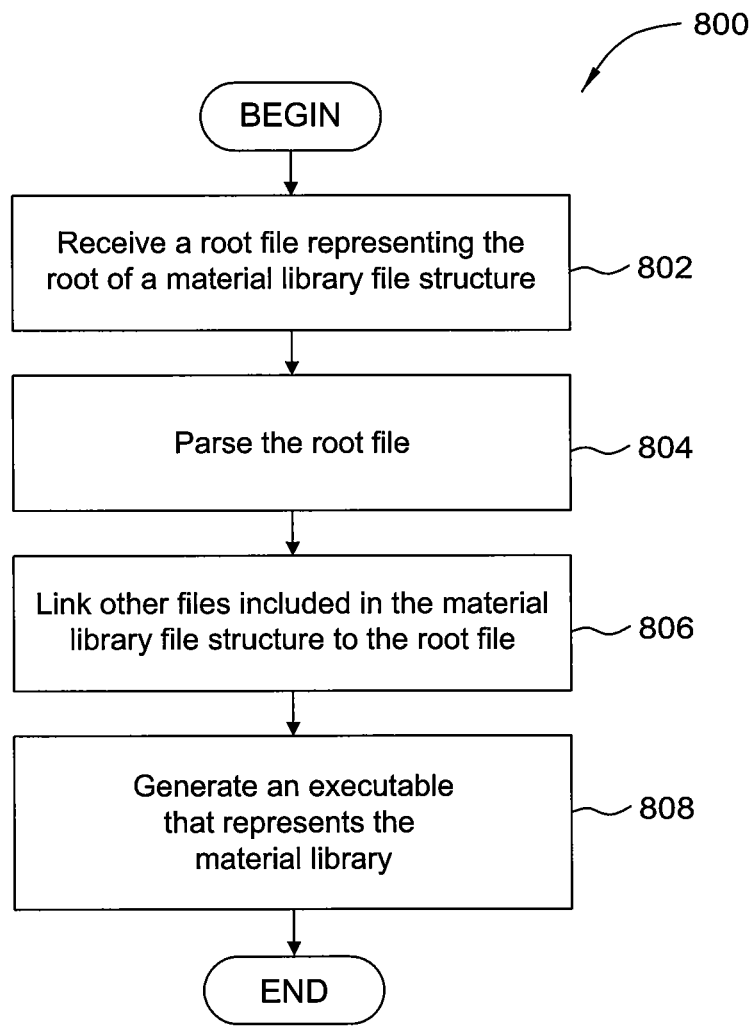
FIG. 8 is a flow diagram of method steps for compiling the file structure that represents a material library into an executable, according to one embodiment of the invention.

FIG. 8 is a flow diagram of method steps for compiling the file structure 600 that represents a material library 108 into an executable, according to one embodiment of the invention. Persons skilled in the art will understand that, even though the method 800 is described in conjunction with the systems of FIGS. 1-6, any system configured to perform the method steps, in any order, is within the scope of the invention.

As shown, the method 800 begins at step 802, where the material library compiler 210 receives a root file 602 representing a root of the material library file structure 600. The root file 602 may include references to each material class file 604-1 included in the file structure 600. At step 804, the material library compiler 210 parses the root file 602.

At step 806, the material library compiler 210 links other files included in the file structure 600 to the root file 602. Linking the other files may include recursively following the reference pointers included in the root file 602 to the other files included in the file structure. These other files may include, without limitation, the material class files 604-1, the rendering implementation files 612-1 to 612-N, the user interface files 614-1 to 614-N, the preset files 616-1 to 616-N, and any other intermediary files that link together the file structure 600, such as files the comprise the rendering implementation file structure 606, the user interface file structure 608, and the preset file structure 610. If a particular file that is referenced by the root file 602 or by any other file cannot be found, the material library compiler 210 returns an error message.

At step 808, the material library compiler 210 generates an executable that represents the material library 108. In one embodiment, the executable is a file that is shipped with the rendering application 104. In alternative embodiments, the material library compiler 210 may be configured to generate more than one executable file representing the material library (e.g., when a single executable file is too large in size to be manageable).

Figure 9:
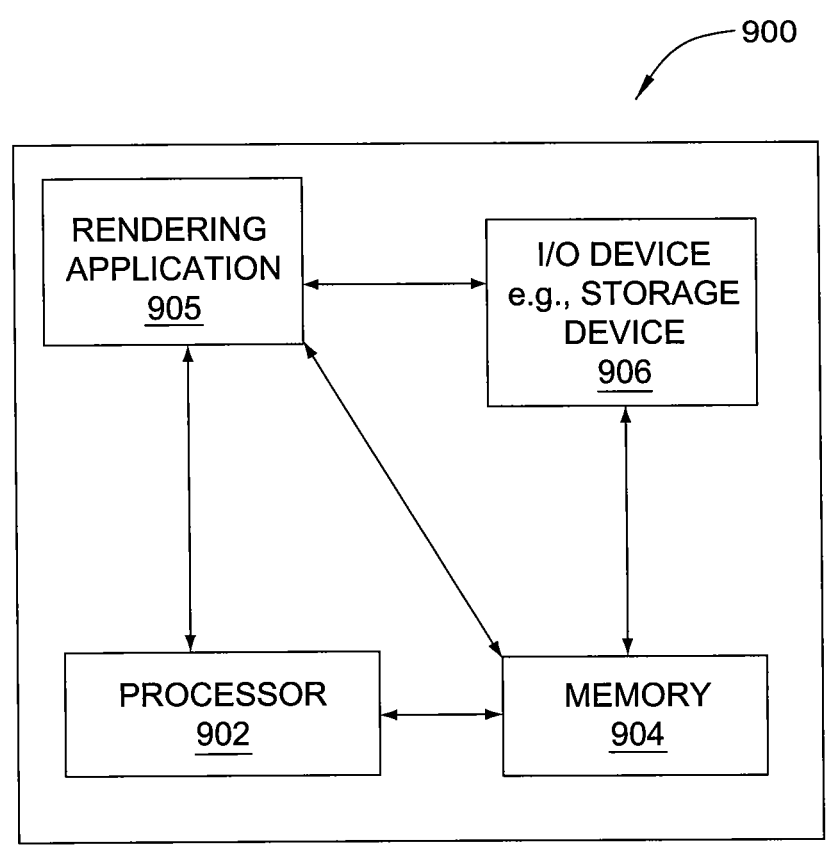
FIG. 9 depicts a high level block diagram of a general purpose computer configured to implement one or more aspects of the present invention.

FIG. 9 depicts a high level block diagram of a general purpose computer configured to implement one or more aspects of the present invention. As shown, system 900 includes a processor element 902 (e.g., a CPU), a memory 904, e.g., random access memory (RAM) and/or read only memory (ROM), a rendering application 905 configured to access a material library 108, as described herein, and various input/output devices 906, which may include storage devices, including but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

One advantage of the techniques disclosed herein is that developers are able to organize files of heterogeneous data types in a common library more effectively when compared to prior art techniques.

A second advantage involves allowing developers to more easily manipulate and update the files included in the material library 108. Developers are able to use different software tools included in the material library generation toolkit 128 to manipulate and update the various files included in the material library 108. This advantage is realized through the use of the XML programming language. Files having native data formats may be translated into XML before being included in the material library 108. Additionally, the XML programming language allows developers to more easily create the linking (i.e., "file structure") that couples the files included in the material library 108. Thus, a larger group of developers is able to take advantage of the systems and methods disclosed herein; whereas, prior art techniques were intended to be used by graphics rendering experts.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for generating a file structure that represents a library of materials, wherein the materials can be applied to geometry in a graphics scene when performing rendering operations, the method comprising:
    generating a class file that includes material parameters representing rendering characteristics of a material class;
    generating a library root file that includes a reference to the class file;
    generating a rendering implementation file for translating values of the material parameters into a format recognized by a particular rendering engine;
    generating a user interface file that includes at least one user interface configured to allow a user to modify the values of the material parameters;
    linking the class file to the library root file;
    generating a rendering implementation file structure that includes one or more files that link the class file and the rendering implementation file; and
    generating a user interface file structure that includes one or more files that link the class file and the user interface file.

2. The method of claim 1, wherein the step of generating the user interface file comprises executing a software tool configured to create the user interface file.

3. The method of claim 1, wherein the step of generating the class file comprises executing a shader engine configured to define the material parameters included in the class file.

4. The method of claim 1, further comprising the steps of:
    generating a preset file that includes a set of values for the material parameters for each of one or more presets, wherein each preset comprises an instance of the material class; and
    linking the preset file to the class file.

5. The method of claim 4, wherein the step of generating the preset file comprises executing a software tool configured for translating between a spreadsheet file having a first format and the preset file having a second format.

6. The method of claim 5, further comprising the step of generating a preset file structure that includes one or more files that links the class file and the preset file.

7. The method of claim 6, wherein the preset file and the one or more files included in the preset file structure comprise Extensible Markup Language (XML) files.

8. The method of claim 1, wherein the one or more files included in the rendering implementation file structure and the user interface file structure comprise XML files.

9. The method of claim 1, wherein the library root file, the class file, the rendering implementation file, and the user interface file comprise XML files.

10. The method of claim 1, further comprising the step of compiling the file structure into an executable file.

11. A non-transitory computer-readable medium storing instructions, that when executed by a processor, cause a computer system to compile a library into one or more executable files, by performing the steps of:
    receiving a library root file that includes references to one or more class files, each having material parameters representing rendering characteristics associated with a material class;
    parsing the library root file to determine a first reference to a first class file;
    linking the first class file to the library root file;
    linking the class file to a rendering implementation file configured for translating values of the material parameters into a format recognized by a particular rendering engine;
    linking the material class file to a user interface file that includes at least one user interface configured to allow a user to modify the values of the material parameters; and
    generating an executable file representing the library based on the linking between the first class file and the library root file and further based on the linking between the rendering implementation file and the class file.

12. The computer-readable medium of claim 11, wherein the library root file and the class file comprise XML files.

13. The computer-readable medium of claim 11, wherein the step of generating the executable is further based on the linking between the user interface file and the class file.

14. The computer-readable medium of claim 13, further comprising the step of linking the material class file to a preset file that includes a set of values for the material parameters for each of one or more presets, wherein each preset comprises an instance of the material class.

15. The computer-readable medium of claim 14, wherein the step of generating the executable is further based on the linking between the preset file and the class file.

16. The computer-readable medium of claim 15, wherein the rendering implementation file, the user interface file, and the preset file comprise XML files.

* * * * *